US012504130B1

(12) United States Patent
Lin et al.

(10) Patent No.: US 12,504,130 B1
(45) Date of Patent: Dec. 23, 2025

(54) LIGHTING APPARATUS WITH SWITCH ROTATING RING AT BOTTOM OF EDISON CAP

(71) Applicant: LEEDARSON LIGHTING CO., LTD., Fujian (CN)

(72) Inventors: Wenhao Lin, Fujian (CN); Huasheng Liu, Fujian (CN); Yanzeng Gao, Fujian (CN); Hongkui Jiang, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 0 days.

(21) Appl. No.: 18/936,518

(22) Filed: Nov. 4, 2024

(30) Foreign Application Priority Data

Jun. 24, 2024 (CN) ........................ 202421446374.1

(51) Int. Cl.
*F21K 9/238* (2016.01)
*F21V 23/04* (2006.01)

(52) U.S. Cl.
CPC .............. *F21K 9/238* (2016.08); *F21V 23/04* (2013.01)

(58) Field of Classification Search
CPC .......... F21K 9/238; F21K 9/235; F21K 9/232; F21K 9/23; F21V 23/04; F21V 19/0055; F21V 23/06; F21V 19/003; F21V 19/001
See application file for complete search history.

(56) References Cited

U.S. PATENT DOCUMENTS

| | | | | | |
|---|---|---|---|---|---|
| 6,149,283 | A * | 11/2000 | Conway | F21V 23/02 | 362/249.05 |
| 6,220,722 | B1 * | 4/2001 | Begemann | F21K 9/232 | 362/555 |
| 6,242,872 | B1 * | 6/2001 | Ha | H05B 47/16 | 315/293 |
| 6,586,882 | B1 * | 7/2003 | Harbers | F21V 13/08 | 362/555 |
| 7,665,882 | B1 * | 2/2010 | Wang | F21K 9/232 | 362/253 |
| 8,317,362 | B2 * | 11/2012 | Ku | F21K 9/232 | 362/240 |
| 8,947,013 | B2 * | 2/2015 | Sutardja | F21K 9/64 | 362/240 |
| 9,657,928 | B1 * | 5/2017 | Jacobson | F21K 9/232 | |
| 11,353,184 | B2 * | 6/2022 | Li | F21K 9/232 | |
| 11,371,663 | B2 * | 6/2022 | Pyshos | F21K 9/235 | |
| 11,473,735 | B2 * | 10/2022 | Chen | F21K 9/232 | |
| 2011/0095687 | A1 * | 4/2011 | Jonsson | F21K 9/232 | 29/592.1 |
| 2015/0061497 | A1 * | 3/2015 | Martins | F21K 9/232 | 315/291 |

* cited by examiner

*Primary Examiner* — Ismael Negron
(74) *Attorney, Agent, or Firm* — LANWAY IPR SERVICES; Chun-Ming Shih

(57) ABSTRACT

A lighting apparatus includes a bulb shell, a light source, a driver, an Edison cap and a rotating ring. The driver converts an external power to a driving current to the light source. The driver has a setting switch. A movement of the setting switch triggers a driver circuit of the driver to configure a corresponding light setting of the light source. The Edison cap has a top edge coupled to the bulb shell. The Edison cap routes the external power source to the driver. The rotating ring is attached to a bottom side of the Edison cap. The rotating ring has a connector coupled to the setting switch to enable the movement to set the corresponding light setting.

19 Claims, 7 Drawing Sheets

LIGHTING APPARATUS WITH SWITCH ROTATING RING AT BOTTOM OF EDISON CAP

FIELD

The present invention is related to a lighting apparatus, and more particularly related to a lighting apparatus with a flexible control.

BACKGROUND

LED technology has become a cornerstone in modern lighting solutions, transforming how people illuminate their environments. Initially used for simple indicator lights, LEDs have evolved into versatile light sources that power an array of devices in both commercial and residential settings. The demand for efficient, durable, and adaptable lighting has driven LED innovation, making these devices a preferred choice across industries.

LEDs are widely incorporated into various light device designs, offering flexibility for different applications. Whether in homes, offices, outdoor spaces, or industrial facilities, LEDs provide efficient and reliable illumination tailored to the specific needs of each location. Their adaptability has enabled designers to create light devices that can meet the unique requirements of diverse environments and tasks.

The widespread application of LED technology has revolutionized lighting across sectors. In residential spaces, LEDs provide soft, ambient lighting for relaxation, while commercial spaces utilize them for bright, focused illumination suited for productivity. In outdoor settings, LEDs are essential for their durability and energy efficiency, particularly in street lighting and landscape lighting.

As LED technology has advanced, so has the focus on developing specialized light devices that cater to different lighting needs. Today, LED light devices are available in a variety of shapes, colors, and intensities, making them suitable for everything from decorative lighting to high-intensity work lights. This versatility has allowed LED devices to replace many conventional lighting solutions.

Cost is a critical consideration in the development and adoption of LED light devices. LEDs, while initially more expensive than traditional lighting, offer long-term savings through reduced energy consumption and minimal maintenance. This cost-effectiveness has encouraged wider adoption, with LED prices continuing to decrease as production scales up, further enhancing their accessibility.

The innovation in LED technology is also motivated by the increasing demand for sustainable solutions. LEDs consume less energy than incandescent and fluorescent lighting, contributing to lower carbon emissions. This energy efficiency aligns with global efforts to reduce environmental impact, making LEDs a valuable choice for eco-conscious consumers and businesses alike.

People use a variety of LED light devices to suit specific locations and preferences. Adjustable LED fixtures, for example, allow users to modify brightness and color temperature based on the task or mood. From warm, welcoming lights for living spaces to bright, precise lighting for work environments, LEDs provide customizable solutions that enhance user experience.

Innovation in LED technology continues to drive improvements in lighting quality and efficiency. Manufacturers constantly seek new ways to enhance LED performance, focusing on brightness, color accuracy, and energy conservation. These improvements not only meet consumer demand but also push the boundaries of what light devices can achieve, enabling applications previously impossible with conventional lighting.

The widespread use of LEDs reflects their value in everyday life. With applications ranging from headlights in vehicles to emergency lighting in public spaces, LEDs play a crucial role in safety and convenience. Their reliability in various conditions further solidifies LEDs as an essential component in modern light device design.

LED technology has transformed the lighting landscape, providing efficient, adaptable, and sustainable solutions for diverse applications. The continuous advancement of LEDs and the focus on innovation have led to the creation of light devices that not only meet but exceed user expectations. As the LED industry grows, so does the potential for new applications that improve how people interact with their illuminated environments.

SUMMARY

In some embodiments, a lighting apparatus includes a bulb shell, a light source, a driver, an Edison cap and a rotating ring.

The driver converts an external power to a driving current to the light source.

The driver has a setting switch.

A movement of the setting switch triggers a driver circuit of the driver to configure a corresponding light setting of the light source.

The Edison cap has a top edge coupled to the bulb shell. The Edison cap routes the external power source to the driver.

The rotating ring is attached to a bottom side of the Edison cap. The rotating ring has a connector coupled to the setting switch to enable the movement to set the corresponding light setting.

In some embodiments, the Edison cap has a bottom terminal for receiving a first terminal of the external power source.

The Edison cap has a lateral wall for receiving a second terminal of the external power source.

The first terminal and the second terminal receive an AC current of the external power source.

In some embodiments, the rotating ring is disposed between the bottom terminal of the Edison cap and the lateral wall of the Edison cap.

In some embodiments, the rotating ring is rotated with respect to the lateral wall of the Edison cap to carry the movement of the setting switch of the driver.

In some embodiments, the connector of the rotating ring has a gear-shaped notch for fitting a corresponding gear shaft of the setting switch.

When the rotating ring is rotated, the gear-shaped notch carries the gear shaft to rotate.

In some embodiments, an external surface of the rotating ring has a operating groove for a user to press the rotating ring to rotate with respect to the lateral wall of the Edison cap.

In some embodiments, the rotating ring has a pressing button.

When the pressing button is pressed, the rotating ring is capable of being rotated with the lateral wall of the Edison cap.

When the pressing button is not pressed, the rotating ring is locked with respect to the lateral wall of the Edison cap.

In some embodiments, a heat sink cup surrounds the driver.

The heat sink cup has an opening for the connector of the driver to couple to the rotating ring.

In some embodiments, the light source includes an elongated light strip.

The elongated light strip includes multiple LED modules with different light parameters.

In some embodiments, the driver adjusts a driving current ratio among the multiple LED modules to achieve a desired light parameter.

In some embodiments, the light source includes a glass column coupled with the bulb shell to form a concealed space for enclosing the elongated light strip.

In some embodiments, oxygen air is more than 1% of a total gas weight amount in the concealed space.

In some embodiments, the elongated strip has a transparent conductive substrate that serves an antenna for the driver to receive a wireless signal.

In some embodiments, the driver overrides the light setting of setting switch with the wireless signal.

In some embodiments, the bulb shell is rotatable with respect to the Edison cap for changing an auxiliary setting of the driver.

In some embodiments, the driver determines the light setting of the light source by the auxiliary setting and the movement of the setting switch.

In some embodiments, the auxiliary setting causes a sub-setting adjustment under a macro-setting caused by the movement of the setting switch.

In some embodiments, the rotating ring is hidden when the Edison cap is installed to an Edison socket.

In some embodiments, the light setting indicated by the setting switch is color temperature. The auxiliary setting is color.

In some embodiments, the light setting indicated by the setting is a color temperature range.

The auxiliary setting is a value within the color temperature range of the light setting.

DETAILED DESCRIPTION

Figure 7:
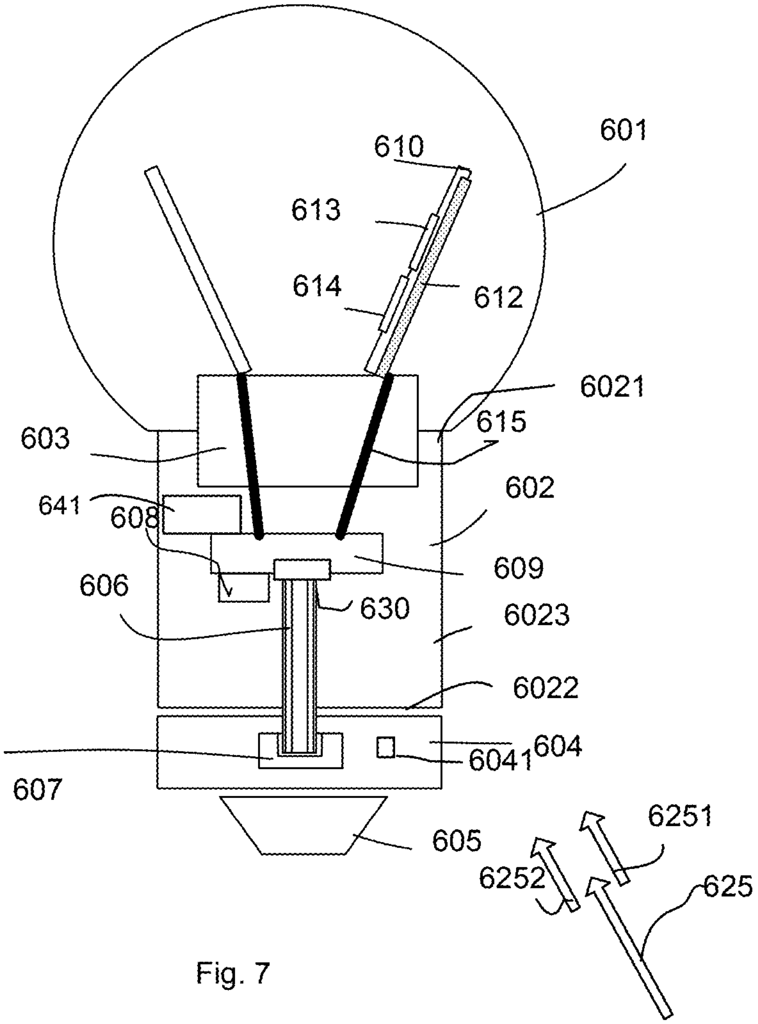
FIG. 7 illustrates another lighting apparatus embodiment.

In FIG. 7, a lighting apparatus includes a bulb shell 601, a light source 610, a driver 609, an Edison cap 602 and a rotating ring 604.

The driver 602 converts an external power 625 to a driving current to the light source 610.

In the example, the external power source may be an indoor AC 110V power. Indoor 110V AC power is a standard in North American households and many other regions, providing a reliable power supply for most appliances and lighting fixtures. This voltage level is efficient for delivering power safely to residential and commercial buildings without the need for heavy-duty insulation and high-voltage components, making it ideal for everyday use. Alternating Current (AC) at 110 volts means that the electric current periodically reverses direction, typically at a frequency of 60 Hz in the U.S., which helps reduce energy loss during transmission over distances.

The transmission of 110V AC power within a home relies on three main wires: the hot wire, the neutral wire, and the ground wire. The hot wire (typically black) carries the live current from the circuit breaker panel to outlets and fixtures, supplying the energy needed to power connected devices. The neutral wire (usually white) completes the circuit by carrying the current back to the panel, allowing it to return safely to the source. These wires form a closed loop that ensures a continuous flow of electricity through devices and back to the panel, enabling the effective use of AC power.

The Edison cap and socket system is a widely used and standardized method for connecting 110V AC power to light bulbs, especially in residential and commercial lighting. Named after inventor Thomas Edison, this screw-type cap and socket design has been used for over a century and is notable for its simplicity and reliability. The Edison cap (also known as the base of the bulb) features a threaded metal section that screws into the corresponding Edison socket. This socket is wired to deliver 110V AC power safely, with one contact point at the center of the socket connecting to the hot wire and the threaded section connecting to the neutral wire. When the bulb is screwed into the socket, the contacts are properly aligned, allowing the AC power to flow through the bulb's filament (or LED components) to produce light.

The Edison cap and socket are designed to ensure a secure electrical connection, reducing the likelihood of loose or unstable contact that could lead to arcing or overheating. The threaded design enables easy installation and replacement of bulbs, while the socket's interior design keeps the hot and neutral contacts safely apart to prevent short circuits. This straightforward yet robust design has made the Edison cap and socket system a staple for routing 110V AC power to light bulbs, providing a reliable and user-friendly method for lighting applications in various settings.

In some embodiments, a driver is used for converting 110V AC power into appropriate driving currents for devices such as LED modules. Since LED modules require Direct Current (DC) for stable and efficient operation, the driver includes a rectifier to convert the incoming AC power into a steady DC current. This conversion process is essential, as the oscillating nature of AC power is unsuitable for LEDs, which rely on a consistent flow of direct current to maintain uniform brightness and performance. The rectifier, therefore, plays a crucial role in delivering DC power by eliminating the alternating cycles, ensuring that the power supply aligns with the operational requirements of the LED module.

In addition to converting AC to DC, the driver also manages voltage and current regulation to protect the LED module and optimize its lifespan. Given that LEDs require precise current levels to function effectively, the driver incorporates circuits to monitor and adjust the output, preventing fluctuations or surges that could cause flickering, overheating, or other issues that may compromise the module's performance. By maintaining steady output parameters, the driver ensures a smooth, regulated flow of power that keeps the LED operating within safe limits, ultimately supporting consistent light output and durability.

Moreover, in certain configurations, the driver can receive control signals to adjust various lighting parameters, allowing for more customized light output. These control signals may include commands for dimming, color adjustments, or intensity settings, which the driver interprets and translates into adjustments in current or voltage output as needed. This enables dynamic lighting control, making it possible to fine-tune the LED module's behavior based on specific user preferences or environmental conditions, thereby enhancing both functionality and energy efficiency in LED applications.

The driver has a setting switch 630. In some embodiments, output light parameters such as color temperature, color, and intensity can be precisely achieved by adjusting the driving currents supplied to different types of LED modules. By controlling the current directed to each LED type, the driver can mix light in varying proportions to create the desired color temperature or color output. For example, balancing warm and cool white LEDs allows for fine-tuning the color temperature, producing a range from warmer, softer tones to cooler, more daylight-like hues.

In addition to color temperature, color mixing can be achieved by adjusting the current supplied to red, green, and blue (RGB) LED modules. By altering the intensity of each primary color, a broad spectrum of colors can be generated, providing flexibility in creating tailored lighting effects. This approach allows the same lighting setup to transition smoothly between colors, making it ideal for environments where adaptable lighting is required, such as in architectural, theatrical, or display settings.

Furthermore, light intensity can be controlled by modulating the overall current sent to the LED modules. Higher currents produce brighter light output, while lower currents create a dimmer effect, allowing for customizable light levels to suit various applications. This capability of fine-grained control over color temperature, color, and intensity provides users with a versatile and adaptable lighting solution that can be tailored to specific preferences or environmental needs.

In some embodiments, different lighting settings can be pre-configured to allow quick selection and consistent performance across various applications. These settings may be stored in a table format or programmed as conversion logic within an integrated circuit (IC) chip inside the driver. This allows the driver to automatically adjust the necessary driving currents based on the selected setting, producing specific light parameters like color temperature, color, intensity, and brightness. Predefined configurations reduce complexity for users, allowing them to access desired lighting effects easily without needing to manually fine-tune each parameter.

For added convenience, the driver may be equipped with control options accessible from a remote control or wall switch, allowing users to switch between settings seamlessly from a distance. These controls can offer simple commands to adjust lighting characteristics such as dimming, color temperature changes, or switching between preset colors. The ability to select settings remotely allows users to adapt the lighting to different activities or moods effortlessly, making it suitable for environments where the ambiance needs to be changed frequently, such as homes, theaters, or retail spaces.

In certain designs, the driver may also include a driver circuit that reads the specific setting chosen by the user, for example, through a rotary switch that provides multiple positions. Each position on the rotary switch can correspond to a different lighting preset, such as a specific color temperature, hue, or intensity level. For instance, one position might select a warm white color for a cozy atmosphere, while another might set a cool white for task lighting. This configuration allows for intuitive control, as users can simply rotate the switch to adjust the lighting according to their needs without complex adjustments.

Additionally, user-selectable options can extend to ambient light adjustment and circadian lighting modes that adapt lighting based on time of day. In environments where natural light is limited, circadian modes can adjust the color temperature throughout the day to simulate natural daylight cycles, helping to maintain a healthy rhythm for occupants. The driver circuit can be programmed to gradually shift color temperature and intensity based on preset times or according to ambient light sensors, automatically creating a comfortable lighting environment that aligns with human natural cycles.

Moreover, scene settings can be stored as configurations, offering a variety of lighting effects, such as accent lighting, spotlighting, or relaxation modes, where light color and brightness are tailored to suit specific occasions. For instance, an accent lighting setting could produce high-intensity white light for focused illumination, while a relaxation mode may combine warm colors with lower brightness for a calm, soothing effect. By providing these pre-configured options, the driver enables users to achieve a wide array of lighting atmospheres with minimal input, enhancing convenience and adaptability in lighting applications across various settings.

A movement of the setting switch 630 triggers a driver circuit 608 of the driver to configure a corresponding light setting of the light source 610.

The Edison cap has a top edge 6021 coupled to the bulb shell 601. The Edison cap 602 routes the external power source 625 to the driver 609.

The rotating ring 604 is attached to a bottom side 6022 of the Edison cap 602. The rotating ring 604 has a connector 607 coupled to the setting switch 630 to enable the movement to set the corresponding light setting.

In some embodiments, the Edison cap 602 has a bottom terminal 605 for receiving a first terminal of the external power source 625. An Edison cap is designed with a lateral wall and a bottom terminal that work together to connect to the electrical supply, allowing it to receive AC power safely and effectively. The lateral wall, which is threaded, provides a secure physical and electrical connection when screwed into a matching Edison socket. This wall acts as the contact point for the neutral wire, enabling the current to return from the bulb to the power source, completing the circuit. The threaded design ensures that the connection is stable, preventing the bulb from loosening under normal use, while also ensuring consistent electrical contact.

The bottom terminal of the Edison cap is positioned at the base of the bulb and serves as the primary connection to the hot wire. When the bulb is screwed into the socket, this bottom terminal aligns with the hot contact in the socket, allowing the alternating current (AC) power to flow from the power source into the bulb. The combined design of the lateral wall for neutral contact and the bottom terminal for hot contact enables a safe, reliable pathway for electricity to reach the bulb, powering the filament or LED to produce light. This dual-contact structure is fundamental to the safe and efficient operation of Edison-style bulbs in AC lighting systems.

The Edison cap has a lateral wall 6023 for receiving a second terminal of the external power source.

The first terminal 6251 and the second terminal 6252 receive an AC current of the external power source.

AC power circuits consist of two main terminals: the hot wire and the neutral wire. The hot wire carries the electrical current from the power source to the connected device, acting as the "live" line that supplies the alternating current. This wire is typically black or red in color and is connected to one of the terminals in an outlet or fixture, where it serves as the entry point for the electrical energy. The current in the hot wire oscillates back and forth in a sinusoidal pattern, switching direction many times per second (usually at a frequency of 60 Hz in North America), enabling the efficient transmission of energy over distances.

The neutral wire completes the circuit by providing a return path for the current to flow back to the power source. Typically white, the neutral wire is connected to the second terminal in an outlet or fixture and is grounded at the main service panel, which helps to stabilize voltage levels in the circuit. Together, the hot and neutral wires create a closed loop that allows the current to travel safely and consistently through connected devices. The arrangement of these two terminals, with one actively delivering power and the other returning it, is essential for maintaining a safe and balanced AC power system that powers everything from household lighting to industrial machinery.

In some embodiments, the rotating ring 604 is disposed between the bottom terminal 605 of the Edison cap 602 and the lateral wall 6023 of the Edison cap 602.

In some embodiments, the rotating ring is rotated with respect to the lateral wall 6023 of the Edison cap to carry the movement of the setting switch 630 of the driver.

Figure 5:
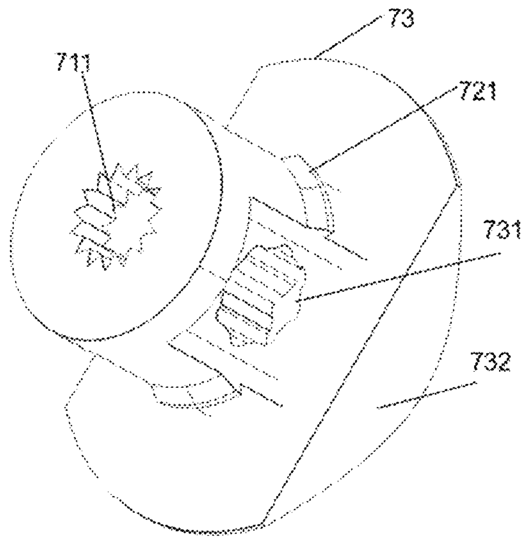
FIG. 5 illustrates another view of the example in FIG. 4.

In some embodiments, the connector of the rotating ring has a gear-shaped notch for fitting a corresponding gear shaft of the setting switch. FIG. 5 shows such an example. In FIG. 7, the setting switch has a gear shaft 606.

When the rotating ring is rotated, the gear-shaped notch carries the gear shaft 606 to rotate.

In some embodiments, an external surface of the rotating ring has an operating groove for a user to press the rotating ring to rotate with respect to the lateral wall of the Edison cap. For example, the component indicated with reference 732 serves the groove.

In some embodiments, the rotating ring has a pressing button 6041.

When the pressing button 6041 is pressed, the rotating ring 604 is capable of being rotated with the lateral wall of the Edison cap.

When the pressing button is not pressed, the rotating ring is locked with respect to the lateral wall of the Edison cap. To create a button that controls the rotation of a ring, start by adding a pressable button that will serve as the activation mechanism. When the button is pressed, it triggers a mechanism (mechanical or electronic) that unlocks the ring, allowing it to rotate freely. This could be achieved with a latch, solenoid, or motor control system that releases the ring from its locked position upon button press. For example, in a mechanical design, pressing the button might disengage a pin or locking tooth from a notch in the ring, enabling smooth rotation. If using an electronic system, the button press could activate a motor to assist in rotating the ring or release a locking component.

When the button is released, the ring should automatically lock in its current position, preventing further movement. This can be done with a spring-loaded pin or a friction brake that engages as soon as the button is no longer pressed. Alternatively, in an electronic setup, sensors can detect when the button is released, immediately stopping any active rotation and re-locking the ring to prevent unintended movement. This combination of a press-to-rotate mechanism provides both control and stability, allowing the user to precisely adjust the ring's position and ensure it stays securely locked when not actively adjusted.

Figure 1:
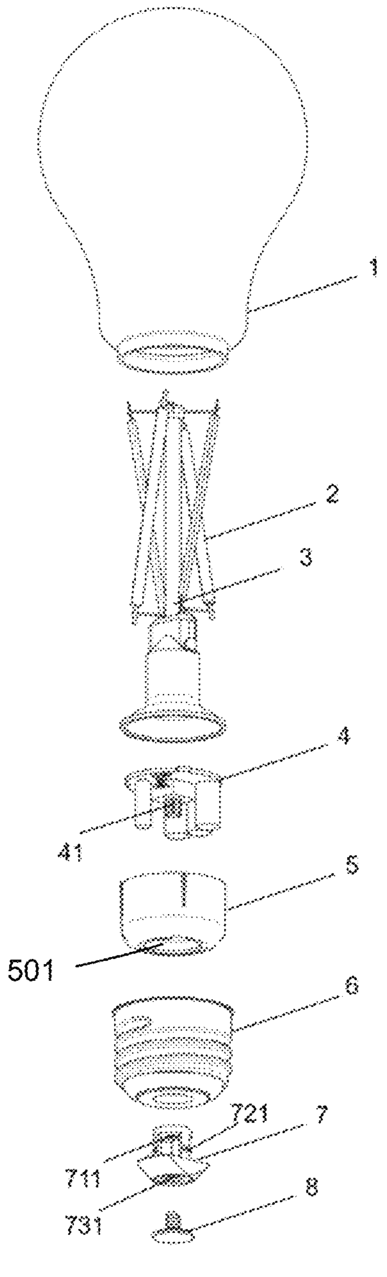
FIG. 1 illustrates an exploded diagram of a lighting apparatus embodiment.

In some embodiments, a heat sink cup surrounds the driver. In FIG. 1, the heat sink cup 5 is used for carrying away heat generated under operation of the lighting apparatus.

The heat sink cup 5 has an opening 501 for the connector of the driver to couple to the rotating ring.

In some embodiments, the light source includes an elongated light strip. FIG. 7 shows two light strips are disposed as the light source. In some embodiments, light strips are used as the primary light source, consisting of an elongated substrate on which multiple LED modules are mounted. These light strips provide a versatile and customizable lighting solution, as the substrate can be manufactured to either be flexible, allowing it to be bent around curves and corners, or rigid, offering stability for fixed installations. The LED modules are spaced evenly along the length of the substrate, producing a consistent light output across the strip and making it suitable for both direct and indirect lighting applications. This design allows for easy installation in various spaces, from under-cabinet lighting to architectural highlights.

Depending on specific requirements, these light strips can be adapted to different levels of brightness, color temperatures, or even color-changing effects by using various LED types and densities. In flexible configurations, the substrate material is often designed to withstand bending and twisting without damaging the LEDs or electrical connections, ideal for dynamic and contoured installations. For rigid strips, the substrate provides a stable mounting base that helps maintain alignment and light distribution, especially in linear applications where a straight and uniform light output is essential. This adaptability makes LED light strips an efficient and popular choice for a wide range of lighting designs, from accent and ambient lighting to task-oriented applications.

The elongated light strip includes multiple LED modules with different light parameters. In some embodiments, LED modules mounted on the elongated substrate can have different parameters, such as varying color temperatures, to allow for customizable lighting effects. These LED modules are configured with specific characteristics, enabling combinations of warm, neutral, and cool light to be emitted from the same strip. By adjusting the driving current of each module individually, the light intensity of each LED type can be controlled to create a balanced mix. This method enables dynamic tuning of the overall light output, allowing users to achieve different shades and warmth levels, such as a cozy warm glow or a bright, daylight-like environment, depending on their needs.

The ability to control the light intensity ratio of each LED module type opens up a wide range of lighting possibilities. For example, by increasing the current to cooler LED modules while reducing it for warmer ones, the strip can emit a higher color temperature suitable for task lighting or workspaces. Conversely, boosting the intensity of warmer LEDs creates a more relaxed, ambient effect. This approach to mixing light parameters through current control provides users with a versatile lighting solution that can easily adapt to different atmospheres and functional requirements, all within a single, streamlined light strip design.

In some embodiments, the driver adjusts a driving current ratio among the multiple LED modules to achieve a desired light parameter.

In some embodiments, the light source includes a glass column coupled with the bulb shell to form a concealed space for enclosing the elongated light strip.

In some embodiments, oxygen air is more than 1% of a total gas weight amount in the concealed space.

In some embodiments, the elongated strip has a transparent conductive substrate that serves an antenna for the driver to receive a wireless signal.

In some embodiments, the driver overrides the light setting of setting switch with the wireless signal.

In some embodiments, the bulb shell is rotatable with respect to the Edison cap for changing an auxiliary setting of the driver.

In some embodiments, the driver determines the light setting of the light source by the auxiliary setting and the movement of the setting switch.

In some embodiments, the auxiliary setting causes a sub-setting adjustment under a macro-setting caused by the movement of the setting switch.

In some embodiments, the bulb shell is designed to rotate relative to the Edison cap, allowing the user to adjust settings directly through the bulb itself. This rotation is used to activate an internal switch mechanism that changes lighting settings based on the position of the bulb shell. For instance, by twisting the bulb shell, the user can select different preset modes, such as brightness levels or color temperature adjustments. This twist-to-set feature provides a simple, intuitive way to control lighting without additional controls or remote devices, embedding the functionality directly within the bulb design.

The driver inside the bulb is configured to detect the rotational position of the bulb shell in relation to the Edison cap. As the user rotates the bulb shell, sensors or rotary encoders 641 within the driver register the change in position, interpreting this movement as a specific setting selection. The driver can then adjust the light output to correspond with the chosen setting, such as increasing the brightness, shifting the color temperature, or switching to a warm ambient light mode. Each rotational position is predefined to trigger a specific response, allowing for easy switching between various lighting effects or intensities based on user preference.

This approach provides a highly integrated control system where the bulb shell serves as both the lighting element and the control interface. By embedding the rotation-based settings mechanism within the bulb, the design minimizes the need for external controls while enhancing usability. The driver's ability to interpret rotation and apply corresponding changes makes it possible for users to tailor their lighting environment effortlessly. This combination of mechanical and electronic control within the bulb itself simplifies the user experience, making it ideal for versatile lighting applications in both residential and commercial settings.

In some embodiments, the rotating ring is hidden when the Edison cap is installed to an Edison socket.

In some embodiments, the light setting indicated by the setting switch is color temperature. The auxiliary setting is color.

In some embodiments, the light setting indicated by the setting is a color temperature range.

The auxiliary setting is a value within the color temperature range of the light setting.

In some embodiments, a main setting is determined by a primary setting switch, which establishes a specific range within which further adjustments can be made. This main setting provides broad control over parameters such as color temperature, brightness, or color intensity. For example, the setting switch may determine a color temperature range, selecting either a warmer 2000K to 3000K or a cooler 3000K to 4000K range. This range selection simplifies the user interface by allowing users to set the general lighting mood or functional level, narrowing down the parameter options to a manageable scope before fine-tuning.

Once the main setting has established the desired range, an auxiliary setting offers additional control within that range, allowing the user to select specific values. For instance, if the main setting is set to the warmer 2000K to 3000K color temperature range, the auxiliary setting can be used to choose more precise color temperatures, such as 2530K or 2800K. This allows for a tailored lighting experience, where the user can adjust the light to achieve a specific ambiance or functional level while staying within the range defined by the main setting. By first defining the range and then making finer adjustments within it, this approach balances simplicity with flexibility, enabling quick access to preferred settings without overwhelming the user with options.

This dual-control approach also provides a structured way for the driver to interpret settings and make necessary adjustments to the light output. When the main setting switch is engaged, the driver recognizes the selected range and adjusts the operating parameters accordingly, such as current levels or modulation patterns. Once the auxiliary setting is adjusted, the driver then fine-tunes the output to the precise value within the defined range. This layered control allows for efficient processing and implementation of user preferences, ensuring that each change produces an immediate, predictable adjustment to the lighting environment.

In a specific embodiment, as shown in FIG. 1, an exploded structural diagram of a filament lamp includes a bulb shell 1, a filament strip 2, a core column 3, a driving component 4, a liner 5, a lamp base 6, a rotary knob 7, and a thumb tack 8. The rotary knob 7 is provided with a first adjustment member, and the driving component 4 includes a second adjustment member. The rotary knob 7 passes through the lamp base 6 and liner 5 to connect the second adjustment member of the driving component 4 via the first adjustment member. The first adjustment member is an adjustment hole 711, and the second adjustment member is an adjustment post 41. The driving component 4 is provided with a switch. When rotating the rotary knob 7, the adjustment hole 711 cooperates with the adjustment post 41 to synchronously rotate to switch the switch positions on the driving component 4. The filament strip 2 is installed on the core column 3, the core column 3 is installed inside the bulb shell 1, the lamp base 6 connects to the bulb shell 1, and the core column 3 is located at the upper part of the driving component 4. The surrounding structure of the adjustment post 41 is serrated, the adjustment hole 711 is a serrated hole, and the serrations on the adjustment post 41 and adjustment hole 711 match each other. By rotating the rotary knob 7, the adjustment hole 711 synchronously drives the adjustment post 41 to rotate through the serrated structure. The driving component 4 is installed inside the liner 5, the liner 5 is installed inside the lamp base 6, and the thumb tack 8 is installed in the through hole 731 of the rotary knob 7 by means of plug-in connection. The rotary knob 7 is provided with a locking block 721, and the rotary knob 7 is assembled with the lamp base 6 through a snap-fit connection.

Figure 2:
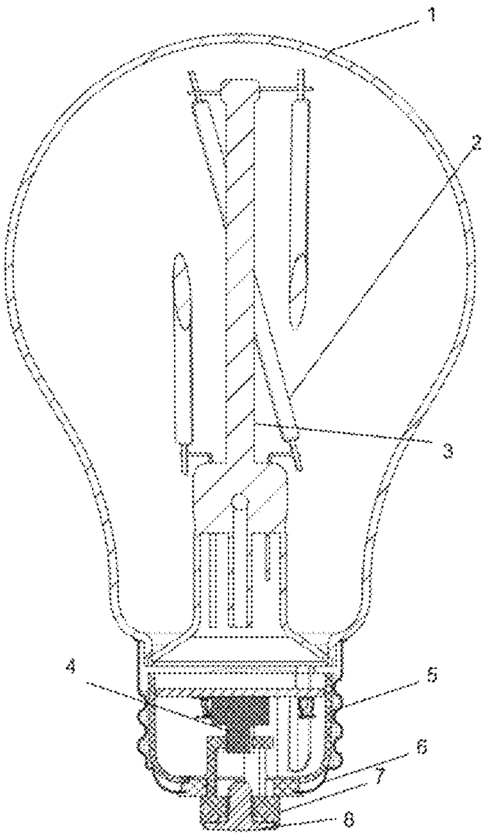
FIG. 2 illustrates a cross-sectional view of the lighting embodiment in FIG. 1.

In a specific embodiment, FIG. 2 shows a structural diagram of a filament lamp, including a bulb shell 1, a filament strip 2, a core column 3, a driving component 4, a liner 5, a lamp base 6, a rotary knob 7, and a thumb tack 8. The rotary knob 7 is provided with a first adjustment member, and the driving component 4 includes a second adjustment member. The rotary knob 7 passes through the lamp base 6 and liner 5 to connect the second adjustment member of the driving component 4 via the first adjustment member. The driving component 4 is provided with a switch. When rotating the rotary knob 7, the first adjustment member cooperates with the second adjustment member to synchronously rotate to switch the switch positions on the driving component 4. The filament strip 2 is installed on the core column 3, the core column 3 is installed inside the bulb shell 1, the lamp base 6 connects to the bulb shell 1, and the core column 3 is located at the upper part of the driving component 4. The driving component 4 is installed inside the liner 5, the liner 5 is installed inside the lamp base 6, and the thumb tack 8 is installed on the rotary knob 7 by means of plug-in connection. The rotary knob 7 is assembled with the lamp base 6 through a snap-fit connection.

Figure 3:
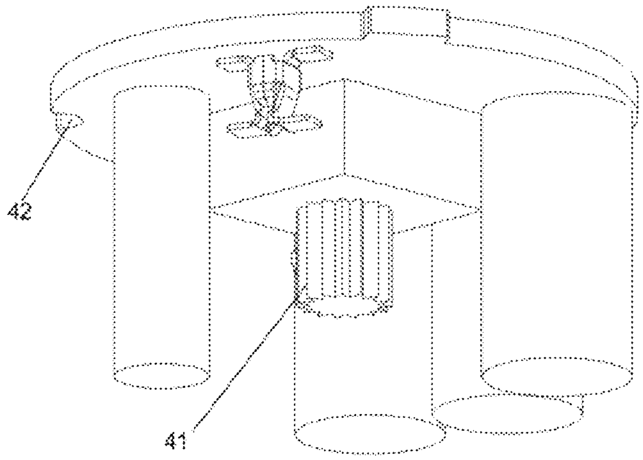
FIG. 3 illustrates a setting switch component example.

In a specific embodiment, FIG. 3 shows a structural diagram of the driving component 4. As shown in FIG. 3, the driving component 4 is provided with an adjustment post 41, the surrounding structure of the adjustment post 41 is serrated, and the driving component 4 also includes an electrical connection device and a control system. The driving component 4 is provided with a limiting notch 42, a circuit board is set inside the driving component 4, and the switch positions are electrically connected to the circuit board.

Figure 4:
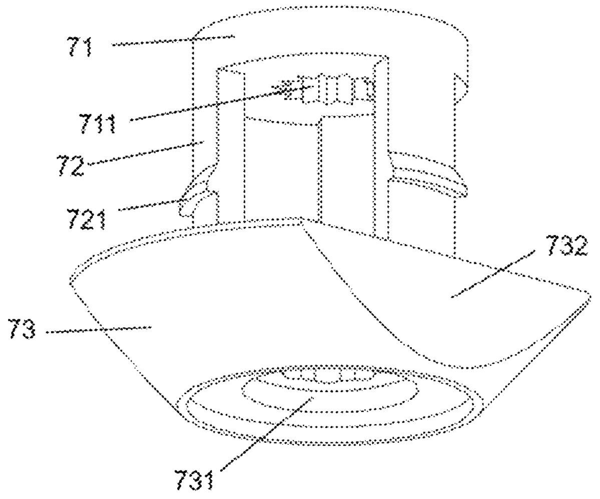
FIG. 4 illustrates a rotating ring example.

In a specific embodiment, FIG. 4 and FIG. 5 show structural diagrams of the rotary knob 7. As shown in FIG. 7, the rotary knob 7 includes a connecting platform 71, a connecting member 72, and a knob body 73. The knob body 73 connects to the connecting member 72, the connecting member 72 connects to the connecting platform 71, the knob body 73 is provided with a flat surface 732 and a through hole 731, the connecting member 72 is provided with a locking block 721, and the connecting platform 71 is provided with a serrated adjustment hole 711.

In a specific embodiment, as shown in FIG. 3, FIG. 4, and FIG. 5, when the connecting platform 711 is provided with a serrated adjustment hole 711, the driving component 4 is provided with an adjustment post 41, and the serrated adjustment hole 711 matches with the serrations on the adjustment post 41. When rotating the knob body 73, the rotary knob 7 synchronously drives the adjustment post 41 to rotate through the serrated structure.

Figure 6:
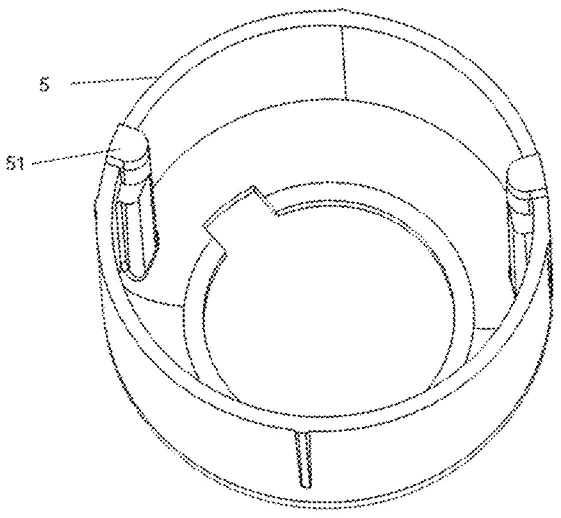
FIG. 6 illustrates an Edison cap example.

In a specific embodiment, FIG. 6 shows a structural diagram of the liner 5. The inner wall of the liner 5 is provided with ribs 51, and the bottom of the liner 5 is provided with a notch. As shown in FIG. 3 and FIG. 6, the liner 5 is positioned and assembled with the limiting notch 42 on the driving component 4 through the ribs 51.

In other embodiments, in addition to setting a serrated adjustment hole 711 on the connecting platform 71 of the rotary knob 7 and a serrated adjustment post 41 on the driving component 4 as described in the above embodiments, a serrated adjustment post can also be set on the connecting platform 73 of the rotary knob 7 and a serrated adjustment hole on the driving component 4, which can similarly achieve the technical effect of this utility model. The rotary knob 7 connects to the switch, and when rotating the rotary knob 7, the rotary knob 7 synchronously drives the second adjustment member on the driving component 4 to rotate through the matching serrated structure between the adjustment hole and adjustment post, and changes the switch positions to adjust the functions of the filament lamp.

LED filament, also known as LED light column, can achieve 360° omnidirectional illumination, offering wide-angle lighting without requiring additional lenses, thereby realizing three-dimensional light source and bringing unprecedented lighting experience. Existing LED filament lamps often include dimming or color temperature adjustment functions. However, conventional filament lamps are limited by the fixed connection between the glass bulb and lamp base, making it difficult to quickly and conveniently switch the lamp's color temperature and luminous flux.

To solve the aforementioned problems existing in the prior art, this application provides a filament lamp with a lamp base knob structure, which can achieve switching of the lamp's lighting effects or functions by rotating the rotary knob, thereby overcoming the deficiencies in the existing technology.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a bulb shell;

a light source;

a driver, wherein the driver converts an external power to a driving current to the light source, wherein the driver has a setting switch, wherein a movement of the setting switch triggers a driver circuit of the driver to configure a corresponding light setting of the light source;

an Edison cap, wherein the Edison cap has a top edge coupled to the bulb shell, wherein the Edison cap routes the external power source to the driver; and a rotating ring, wherein the rotating ring is attached to a bottom side of the Edison cap, wherein the rotating ring has a connector coupled to the setting switch to enable the movement to set the corresponding light setting, wherein the bulb shell is rotatable with respect to the Edison cap for changing an auxiliary setting of the driver.

2. The lighting apparatus of claim 1, wherein the driver determines the light setting of the light source by the auxiliary setting and the movement of the setting switch.

3. The lighting apparatus of claim 1, wherein the auxiliary setting causes a sub-setting adjustment under a macro-setting caused by the movement of the setting switch.

4. The lighting apparatus of claim 3, wherein the rotating ring is hidden when the Edison cap is installed to an Edison socket.

5. The lighting apparatus of claim 3, wherein the light setting indicated by the setting switch is color temperature, wherein the auxiliary setting is color.

6. The lighting apparatus of claim 3, wherein the light setting indicated by the setting is a color temperature range, wherein the auxiliary setting is a value within the color temperature range of the light setting.

7. The lighting apparatus of claim 1, wherein the light source comprises an elongated light strip, wherein the elongated light strip comprises multiple LED modules with different light parameters.

8. The lighting apparatus of claim 7, wherein the driver adjusts a driving current ratio among the multiple LED modules to achieve a desired light parameter.

9. The lighting apparatus of claim 7, wherein the light source comprises a glass column coupled with the bulb shell to form a concealed space for enclosing the elongated light strip.

10. The lighting apparatus of claim 9, wherein oxygen gas is more than 1% of a total gas weight amount in the concealed space.

11. The lighting apparatus of claim 7, wherein the elongated strip has a transparent conductive substrate that serves an antenna for the driver to receive a wireless signal.

12. The lighting apparatus of claim 11, wherein the driver overrides the light setting of setting switch with the wireless signal.

13. The lighting apparatus of claim 1, wherein the Edison cap has a bottom terminal for receiving a first terminal of the external power source, wherein the Edison cap has a lateral wall for receiving a second terminal of the external power source, wherein the first terminal and the second terminal receive an AC current of the external power source.

14. The lighting apparatus of claim 13, wherein a heat sink cup surrounds the driver, wherein the heat sink cup has an opening for the connector of the driver to couple to the rotating ring.

15. The lighting apparatus of claim 13, wherein the rotating ring is disposed between the bottom terminal of the Edison cap and the lateral wall of the Edison cap.

16. The lighting apparatus of claim 15, wherein the rotating ring is rotated with respect to the lateral wall of the Edison cap to carry the movement of the setting switch of the driver.

17. The lighting apparatus of claim 16, wherein the connector of the rotating ring has a gear-shaped notch for fitting a corresponding gear shaft of the setting switch, wherein when the rotating ring is rotated, the gear-shaped notch carries the gear shaft to rotate.

18. The lighting apparatus of claim 17, wherein an external surface of the rotating ring has an operating groove for a user to press the rotating ring to rotate with respect to the lateral wall of the Edison cap.

19. The lighting apparatus of claim 17, wherein the rotating ring has a pressing button, wherein when the pressing button is pressed, the rotating ring is capable of being rotated with the lateral wall of the Edison cap, wherein when the pressing button is not pressed, the rotating ring is locked with respect to the lateral wall of the Edison cap.

* * * * *